US010144323B2

(12) United States Patent
Hosbach et al.

(10) Patent No.: US 10,144,323 B2
(45) Date of Patent: Dec. 4, 2018

(54) VEHICLE SEATING ASSEMBLY HAVING ABRASION RESISTANT SLIP COVER

(71) Applicant: Ford Global Technologies, LLC, Dearborn, MI (US)

(72) Inventors: Christian J. Hosbach, Taylor, MI (US); Kevin Mozurkewich, Livonia, MI (US); Spencer Hoernke, Dundas (CA); Corbin Johnston, Royal Oak, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 15/420,891

(22) Filed: Jan. 31, 2017

(65) Prior Publication Data

US 2018/0215294 A1 Aug. 2, 2018

(51) Int. Cl.
   *B60N 2/60* (2006.01)
   *B60N 2/66* (2006.01)
   *B60N 2/68* (2006.01)

(52) U.S. Cl.
   CPC .............. *B60N 2/60* (2013.01); *B60N 2/66* (2013.01); *B60N 2/68* (2013.01)

(58) Field of Classification Search
   CPC . B60N 2/60; B60N 2/66; B60N 2/663; B60N 2/68; B60N 2/6063
   USPC .......................................... 297/228.1, 284.5
   See application file for complete search history.

(56) References Cited

U.S. PATENT DOCUMENTS

| | | | | | |
|---|---|---|---|---|---|
| 1,964,242 | A | * | 6/1934 | Behrle | B60N 2/60 297/223 |
| 2,771,939 | A | * | 11/1956 | Trubitt | A47C 31/11 297/225 |
| 3,479,085 | A | * | 11/1969 | Weinstein | B60N 2/60 297/188.06 |
| 3,504,941 | A | * | 4/1970 | Gerard | A47C 31/11 297/219.1 |
| 4,232,898 | A | * | 11/1980 | Bodrero | B60N 2/6027 297/224 |
| 4,471,993 | A | * | 9/1984 | Watson | A47C 7/425 297/230.13 |
| 4,487,201 | A | * | 12/1984 | Ciambarella | A47C 7/425 297/484 |
| 4,694,511 | A | * | 9/1987 | Estes | A41D 7/00 2/67 |
| 5,441,331 | A | | 8/1995 | Vento | |
| 5,547,251 | A | * | 8/1996 | Axelson | A61G 5/10 297/188.04 |
| D396,983 | S | * | 8/1998 | Taylor | D12/416 |
| 5,806,925 | A | * | 9/1998 | Hanley | A47C 31/113 297/219.1 |

(Continued)

Primary Examiner — Jose V Chen
(74) Attorney, Agent, or Firm — Vichit Chea; Price Heneveld LLP

(57) ABSTRACT

A vehicle seating assembly includes a seatback having a seatback frame. A bolster insert is positioned on a left side bolster and a right side bolster of the seatback frame. A foam layer is positioned between the seatback frame and a trim cover. The foam layer and the trim cover are contoured to expose the bolster inserts when the vehicle seating assembly is fully assembled. A slip cover has a front-central portion that includes an abrasion resistant material.

19 Claims, 4 Drawing Sheets

(56) References Cited

U.S. PATENT DOCUMENTS

| | | | | |
|---|---|---|---|---|
| 6,334,650 | B1* | 1/2002 | Chien-Chuan | A47C 7/024 297/284.1 |
| 6,648,410 | B2* | 11/2003 | Sparks | B60N 2/6036 297/228.1 |
| 7,258,399 | B2* | 8/2007 | Neustat | A47C 7/72 297/218.2 |
| 7,448,681 | B1* | 11/2008 | Spitzer | A47C 31/11 2/69 |
| 7,651,163 | B2* | 1/2010 | Jaskot | A47C 7/425 297/230.1 |
| 8,919,879 | B1* | 12/2014 | Rice Golin | A45F 4/02 297/224 |
| 9,409,505 | B2 | 8/2016 | Tabbert et al. | |
| 2002/0043834 | A1* | 4/2002 | Jackson | A47C 31/11 297/228.1 |
| 2003/0222494 | A1 | 12/2003 | Mallery | |
| 2005/0173953 | A1* | 8/2005 | Riley | A47C 31/11 297/228.1 |
| 2006/0108842 | A1* | 5/2006 | Davis | A47C 7/66 297/184.13 |
| 2006/0170274 | A1 | 8/2006 | Moule | |
| 2007/0007803 | A1* | 1/2007 | Lawler | A47C 31/11 297/228.1 |
| 2007/0040426 | A1* | 2/2007 | Kenny | B60N 2/6018 297/229 |
| 2007/0145797 | A1* | 6/2007 | Itakura | A47C 31/116 297/228.1 |
| 2011/0049949 | A1 | 3/2011 | Basmaji et al. | |
| 2013/0209735 | A1 | 8/2013 | Kim et al. | |
| 2016/0059756 | A1* | 3/2016 | Matsuhashi | B60N 2/60 297/228.12 |
| 2016/0318430 | A1* | 11/2016 | Umlauf | B60N 2/6009 |

* cited by examiner

VEHICLE SEATING ASSEMBLY HAVING ABRASION RESISTANT SLIP COVER

FIELD OF THE DISCLOSURE

The present disclosure generally relates to vehicle seating assemblies. More specifically, the present disclosure relates to preventing premature wear to vehicle seating assemblies.

BACKGROUND OF THE INVENTION

Utility belts worn by occupants of vehicle seating assemblies can cause premature wear to the vehicle seating assembly. More specifically, the premature wear can be imparted onto the trim cover and foam layer of the vehicle seating assembly. Occupants that wear utility belts include police officers, construction workers, and contractors, to name a few.

SUMMARY OF THE INVENTION

According to one aspect of the present disclosure, a vehicle seating assembly includes a seatback having a seatback frame. A bolster insert is positioned on left and right side bolsters of the seatback frame and a foam layer is positioned over the seatback frame. A trim cover is positioned over the foam layer. The foam layer and the trim cover are contoured to expose the bolster inserts when the vehicle seating assembly is fully assembled. A slip cover is configured to cover a lumbar portion of the seatback. The slip cover has a front-central portion which includes an abrasion resistant material. A rearward portion of the slip cover has a resilient member. The slip cover is generally a tubular shape.

According to another aspect of the present disclosure, a vehicle seating assembly includes a seatback having a seatback frame. A bolster insert is positioned on left and right side bolsters of the seatback frame and a foam layer is positioned over the seatback frame. A trim cover is positioned over the foam layer. The foam layer and the trim cover are contoured to expose the bolster inserts when fully assembled. A slip cover is configured to cover a lumbar portion of the seatback. The slip cover has a front-central portion that includes an abrasion resistant material.

According to yet another aspect of the present disclosure, a vehicle seating assembly includes a seatback having a seatback frame. A bolster insert is positioned on left and right side bolsters of the seatback frame. A foam layer is positioned between the seatback frame and a trim cover. The foam layer and the trim cover are contoured to expose the bolster inserts when fully assembled. A slip cover has a front-central portion which includes an abrasion resistant material.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
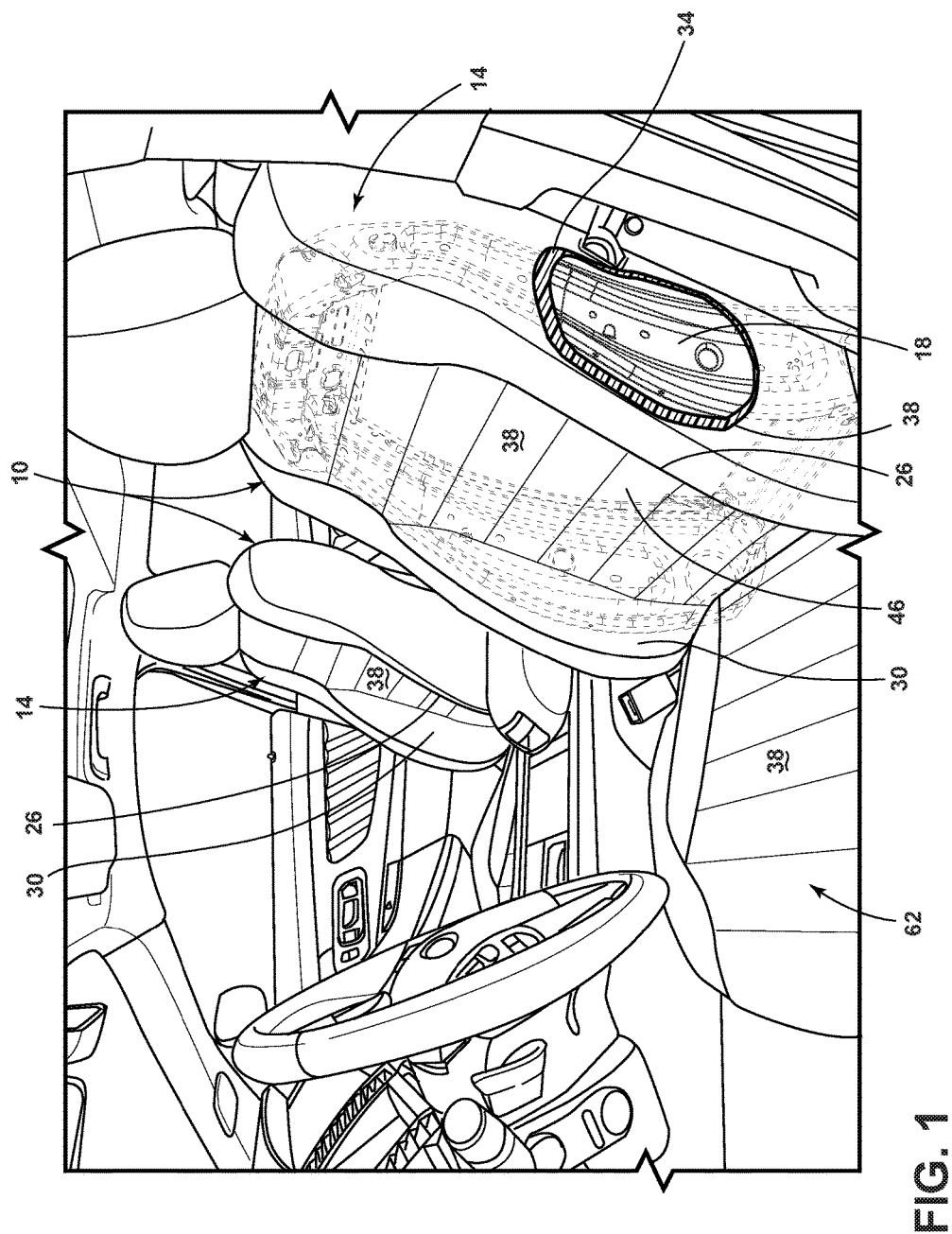
FIG. 1 is a side perspective view of vehicle seating assemblies.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-4, a vehicle seating assembly 10 is illustrated in one embodiment including a seatback 14 having a seatback frame 18. A bolster insert 22 is positioned on a left side bolster 26 and a right side bolster 30 of the seatback frame 18. A foam layer 34 is positioned over the seatback frame 18. A trim cover 38 is positioned over the foam layer 34. The foam layer 34 and the trim cover 38 are contoured to expose the bolster inserts 2.2 when fully assembled. A slip cover 42 is configured to cover a lumbar portion 46 of the seatback 14. The slip cover 42 has a front-central portion 50 made of an abrasion resistant material. A rearward portion 54 of the slip cover 42 includes a resilient member 58. The slip cover 42 is generally tubular in shape.

Referring again to FIG. 1, the vehicle seating assembly 10 can be employed in a driver side front seat, a passenger side front seat, a driver side rear seat, and/or a passenger side rear seat. The vehicle seating assembly 10 can include a seat 62 that is operably coupled to the seatback 14. The operable coupling between the seatback 14 and the seat 62 can include a pivoting coupling that allows the seatback 14 to recline. The lumbar portion 46 of the seatback 14 is flanked on either side by the left side bolster 26 and the right side bolster 30. While the side bolsters 26, 30 are shown at a lower portion of the seatback 14 it is contemplated that the side bolsters 26, 30 can be alternatively or additionally positioned at an upper portion of the seatback 14.

Figure 2:
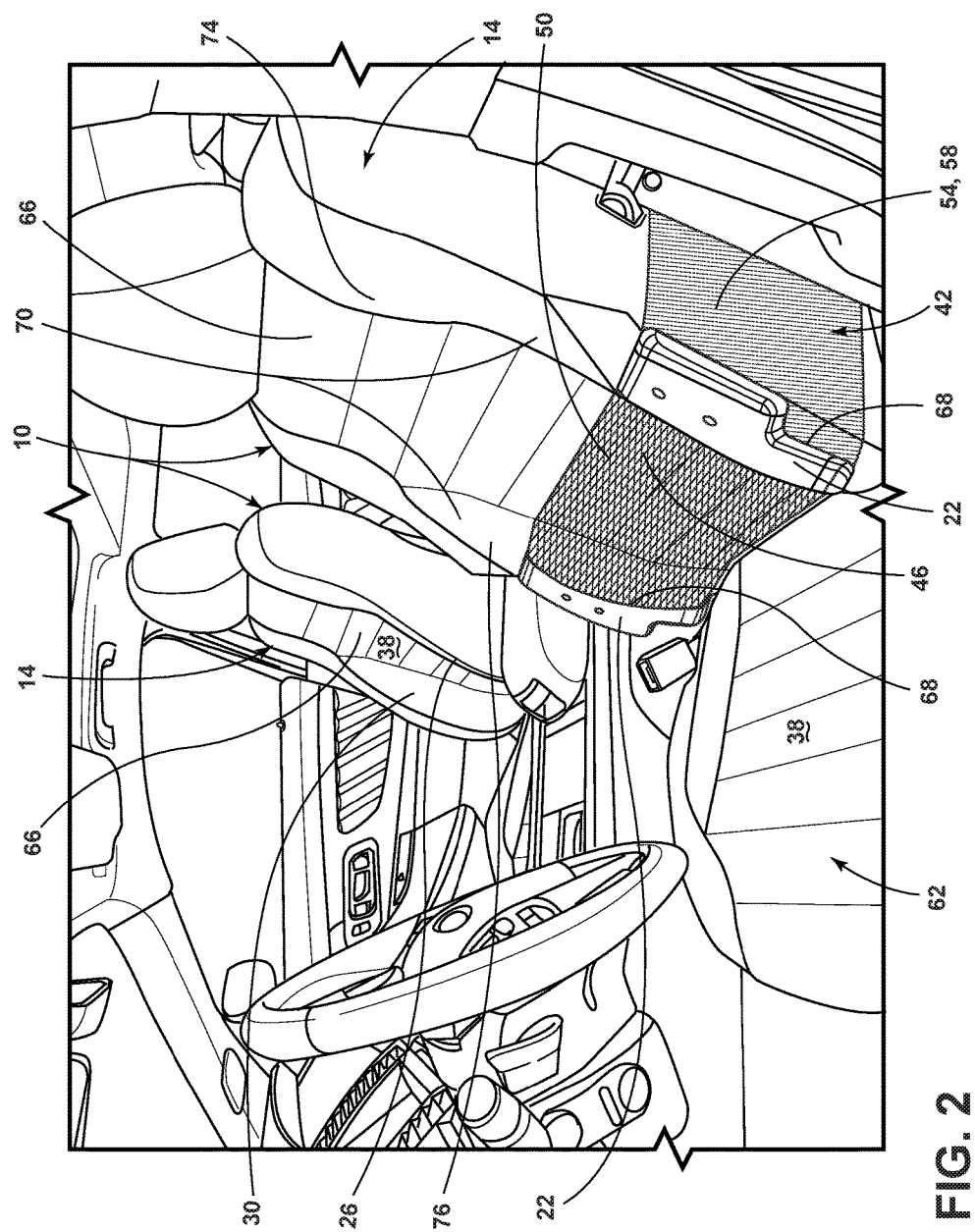
FIG. 2 is a side perspective view of a vehicle seating assembly having an abrasion resistant slip cover.

Referring now to FIG. 2, the vehicle seating assembly 10 is shown with the slip cover 42 installed. When installed, the slip cover 42 may be positioned at the lumbar portion 46 of the seatback 14. The bolster insert 22 is positioned at both the left side bolster 26 and the right side bolster 30. The bolster inserts 22 can be operably coupled to a front surface of the seatback frame 18 such that a generally continuous surface is maintained across the seatback 14. The area of the seatback frame 18 where the bolster insert 22 is installed is generally free of the foam layer 34 and the trim cover 38. In other words, when the bolster insert 22 is installed on the seatback frame 18 the occupant of the vehicle seating assembly 10 is presented with the trim cover 38 in areas of the vehicle seating assembly 10 where the bolster inserts 22 and slip cover 42 are not installed. However, where the bolster inserts 22 are installed, the occupant of the vehicle seating assembly 10 is presented with the surface of the bolster insert 22. The transition between the bolster insert 22 and the trim cover 38 can be generally continuous such that the occupant of the vehicle seating assembly 10 is presented with a generally continuous surface of the vehicle seating assembly 10. In one embodiment, the slip cover 42 can be provided with slots 68 in the regions that correspond with the positioning of the bolster inserts 22 such that the bolster inserts 22 pass through the slots 68. The slots 68 are positioned on either side of the abrasion resistant material of the front-central portion 50.

Referring again to FIG. 2, the degree to which a material or fabric resists abrasion is defined as the number of abrasion-imparting events the material can undergo before the material is worn through or generates a hole (e.g. ingress-egress cycles), which can be referred to as an abrasion rate. The abrasion resistant material utilized herein can be configured to withstand at least 50,000, at least 75,000, or at least 100,000 ingress-egress cycles prior to the abrasion resistant material wearing through or generating a hole. Further, the abrasion resistant material can have an abrasion rate that is at least equivalent to the abrasion rate of duck canvas, Kevlar®, and/or glass-filled composite plastics. The abrasion resistant material can be a woven fabric. Additionally or alternatively, the abrasion resistant material can include a fabric layer and a reinforced layer. The reinforced layer can be on an exterior surface of the fabric layer such that the reinforced layer is positioned between the fabric layer and the occupant when in use. The reinforced layer can be an epoxy layer, a resin layer, and/or a polymer layer. According to one example, the abrasion resistant material in the form of the reinforced layer can be that disclosed in U.S. Patent Publication Number 2013/0209735 to Kim et al. entitled PROTECTIVE MATERIAL HAVING GUARD PLATES WITH IMPROVED SURFACE PROPERTIES, which is hereby incorporated herein by reference, and commercially available by Higher Dimension Materials Incorporated under the tradename SUPERFABRIC®.

Referring further to FIG. 2, a benefit of conventional side bolsters 26, 30 in vehicle seating assemblies 10 is that the occupant of the vehicle seating assembly 10 is provided with lateral support during vehicle maneuvering (e.g. rapid cornering). In order to provide this lateral support, the side bolsters 26, 30 extend forward of a central region 66 of the seatback 14. However, the forward extension of the side bolsters 26, 30 can make ingress and egress more difficult, especially for occupants that wear utility belts while driving. Occupants that wear utility belts include police officers, construction workers and contractors, to name a few. In addition to making ingress and egress more difficult, the forward extension of the side bolsters 26, 30 can result in premature wear of the trim cover 38 and the foam layer 34 of the vehicle seating assembly 10 due to repeated contact with the utility belt and the items held within the utility belt. Additionally, the added pressure of the side bolsters 26, 30 to the utility belt worn by the occupant can result in added discomfort to the occupant while they occupy the vehicle seating assembly 10. The features and concepts disclosed herein overcome these and other issues while maintaining lateral support for the occupant during vehicle maneuvers. The side bolsters 26, 30 are generally removed from the lower portion of the seatback 14 such that the occupant of the vehicle seating assembly 10 is presented with a minimally contoured lumbar portion 46 of the seatback 14. Said another way, the minimally contoured lumbar portion 46 of the seatback 14, which includes bolster inserts 22 at the left side bolster 26 and the right side bolster 30, generally does not provide lateral support to the occupant of the vehicle seating assembly 10 during vehicle maneuvers. However, upper side bolsters 70 are maintained in a shoulder portion 74 of the seatback 14. Alternatively, the upper side bolsters 70 can be positioned at an intermediate portion 76 between the lumbar portion 46 and the shoulder portion 74 that typically contacts the ribs and/or latissimi dorsi of an occupant. The upper side bolsters 70 at the shoulder portion 74 of the seatback 14 provide lateral support to the occupant of the vehicle seating assembly 10 during vehicle maneuvers. The bolster inserts 22 at the left side bolster 26 and the right side bolster 30 prevent premature wear of the trim cover 38 and the foam layer 34. While shown with bolster inserts 22 on both the left side bolster 26 and the right side bolster 30, it is contemplated that the bolster inserts 22 can be provided on either or both of the left side bolster 26 and the right side bolster 30. In other words, while the vehicle seating assembly 10 is shown having two bolster inserts 22 it is contemplated that a single bolster insert 22 can be used on either the left side bolster 26 or the right side bolster 30. The choice of whether to employ a single or multiple bolster inserts 22 can be decided based on expected or proven wear to the trim cover 38 and/or foam layer 34 experienced by a given occupant.

Referring again to FIG. 2, while the vehicle seating assembly 10 is shown with the left side bolster 26 and the right side bolster 30 removed or generally cored away it is contemplated that the concepts disclosed herein can be used in conjunction with vehicle seating assemblies 10 that maintain the left side bolster 26 and the right side bolster 30 such that the occupant of the vehicle seating assembly 10 is presented with a more contoured lumbar portion 46 of the seatback 14 than described above. In such an embodiment, the slip cover 42 remains generally, tubular or band shaped. The difference between this embodiment and that described above is that the bolster inserts 22 are integrally formed with the slip cover 42 such that the slip cover 42 is continuous with the bolster inserts 22 being separated by the front-central portion 50 and by the rearward portion 54. Said another way, the bolster inserts 22 of the alternative embodiment described are not operably coupled to the seatback frame 18. Rather, the slip cover 42 includes the bolster inserts 22, the front-central portion 50, and the rearward portion 54 to provide a solution to the problems described herein that can be used in an aftermarket setting. The slip cover 42 intended for aftermarket use can be installed on any vehicle seating assembly 10 to prevent premature wear to the trim cover 38 and the foam layer 34 of the vehicle seating assembly 10.

Figure 3:
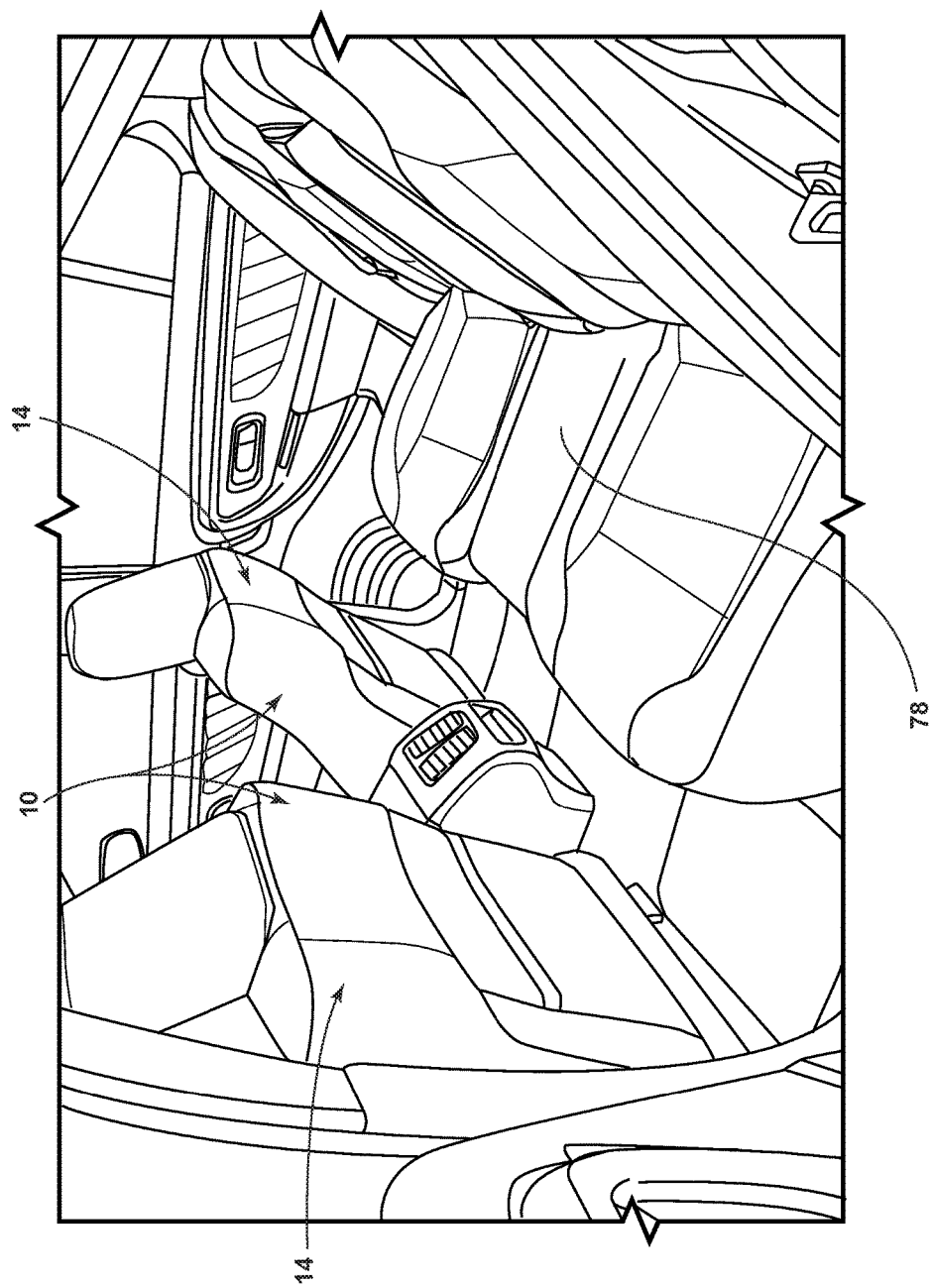
FIG. 3 is a rear perspective view of vehicle seating assemblies.
Figure 4:
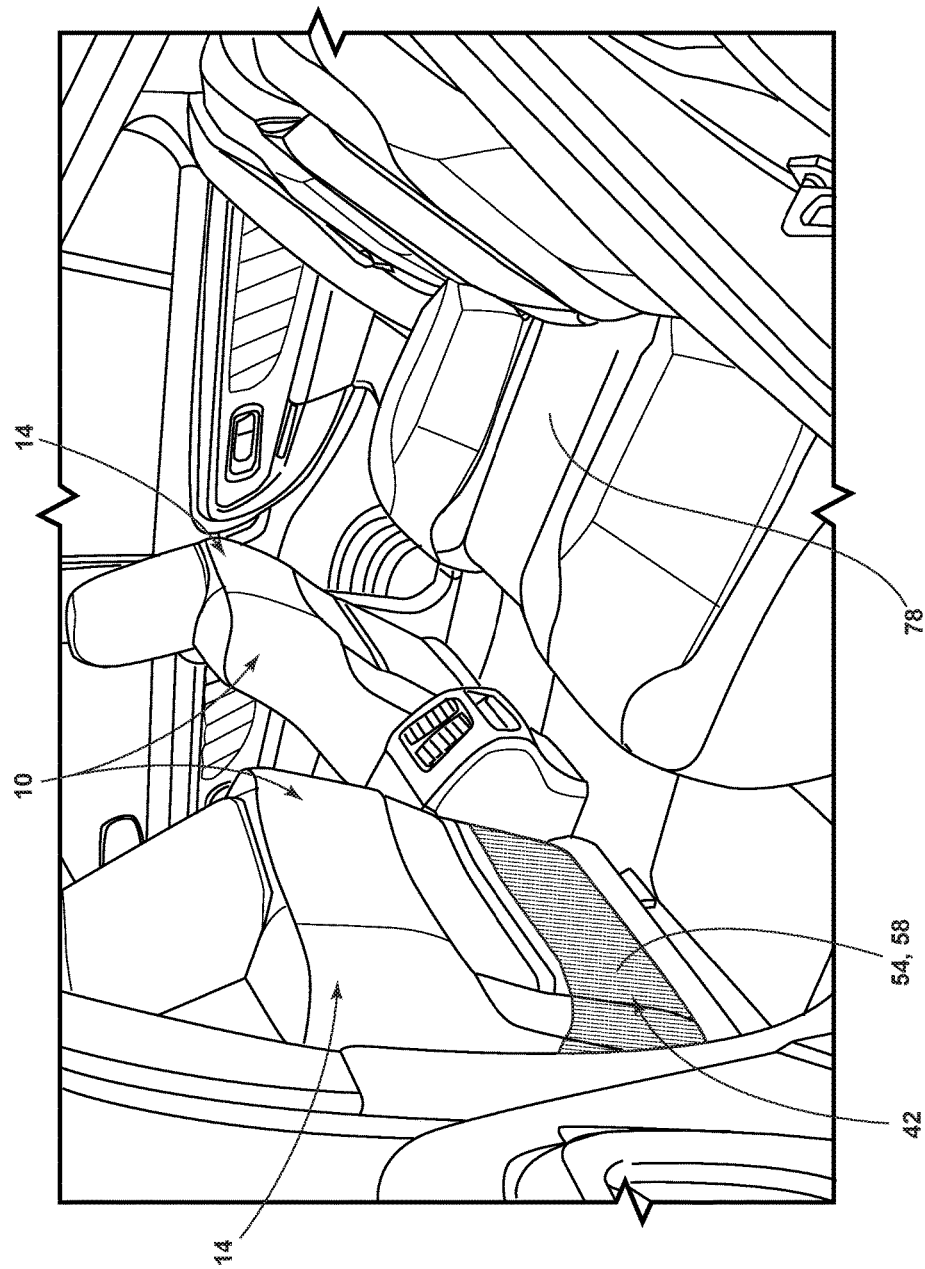
FIG. 4 is a rear perspective view of a vehicle seating assembly having an abrasion resistant slip cover.

Referring to FIGS. 3 and 4, the vehicle seating assembly 10 is shown prior to the installation of the slip cover 42 (FIG. 3) and after installation of the slip cover 42 (FIG. 4). When installing the slip cover 42, the vehicle seating assembly 10 passes through an aperture that exists through the center of the generally tubular slip cover 42. The slip cover 42 removably slides into position on the seatback 14 to cover and protect the lumbar portion 46. The rearward portion 54 of the slip cover 42 extends around the sides and the rear of the seatback 14. The rearward portion 54 of the slip cover 42 includes the resilient member 58 to positively retain the slip cover 42 on the seatback 14. The resilient member 58 can be, for example, an elastic band. The rearward portion 54 of the slip cover 42 extends along the rear of the seatback 14 and the sides of the seatback 14. While shown installed on the driver's side vehicle seating assembly 10, one of ordinary skill in the art will recognize that the slip cover 42 disclosed herein can be installed on any vehicle seating assembly 10 within a vehicle. It is contemplated that the features and concepts disclosed herein are capable of utilization in a rear benchseat assembly 78. Installation on the rear benchseat assembly 78 can be accomplished, for example, by coupling the bolster inserts 22 (FIG. 2) to the rear benchseat frame for the various seating positions in the rear benchseat assembly 78 and providing attachment or coupling features on the bolster inserts 22. The attachment or coupling features can then be utilized to attach the front-central portion 50 (FIG. 2) to the various seating positions in the rear benchseat assembly 78.

Utility belts worn by occupants of vehicle seating assemblies 10 can cause premature wear to the vehicle seating assembly 10. More specifically, the premature wear can be imparted onto the trim cover 38 and foam layer 34 of the vehicle seating assembly 10. Occupants that wear utility belts may include police officers, construction workers, and contractors, to name a few. The features and concepts disclosed herein prevent premature wear to the trim cover 38 and foam layer 34 by providing the bolster insert 22. Rather than having a conventional left side bolster 26 and/or right side bolster 30 at the lower portion of the seatback 14, the foam layer 34 and the trim cover 38 may be removed to expose the seatback frame 18. The removal of the foam layer 34 and the trim cover 38 present a less contoured lumbar region to the occupant of the vehicle seating assembly 10. Additionally, the exposure of the seatback frame 18 permits direct and removable coupling of the bolster insert 22 to the seatback frame 18.

The bolster insert 22 is designed to receive the majority of abrasion-imparting events. An abrasion-imparting event can arise when contact is made between the vehicle seating assembly 10 and a component held within the utility belt. The ingress and egress of the occupant wearing the utility belt can provide increased pressure between the vehicle seating assembly 10 and the components of the utility belt. During ingress and egress, the bolster insert 22 receives the majority of the force of the abrasion-imparting event. The removable, serviceable, and replaceable nature of the bolster insert 22 allows for utilization of the vehicle seating assembly 10 for longer periods of time. In other words, without the bolster insert 22 the trim cover 38 and/or the foam layer 34 on a conventional side bolster 26 would need to be replaced sooner than if the bolster insert 22 had been implemented.

The slip cover 42 provides additional protection to the vehicle seating assembly 10 to decrease or prevent premature wear to the seatback 14. The front-central portion 50 of the slip cover 42 is made of abrasion-resistant material. The abrasion-resistant material of the front-central portion 50 of the slip cover 42 receives abrasion-imparting events that would have otherwise been received by the trim cover 38 or the foam layer 34. The slip cover 42 can be removed, replaced, mended, repaired, or repositioned after the slip cover 42 has been damaged or worn through. The replaceable nature of the bolster inserts 22 and the slip cover 42 allow for utilization of the vehicle seating assembly 10 for longer periods of time than if the bolster inserts 22 and/or the slip cover 42 had not been installed.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
   a seatback having a seatback frame;
   a bolster insert positioned on a left side bolster and a right side bolster of the seatback frame;
   a foam layer positioned over the seatback frame;
   a trim cover positioned over the foam layer, wherein the foam layer and the trim cover are contoured to expose the bolster inserts when fully assembled; and
   a slip cover configured to cover a lumbar portion of the seatback, wherein the slip cover has a front-central portion comprising an abrasion resistant material.

2. The vehicle seating assembly of claim 1, further comprising:
   a rearward portion of the slip cover having a resilient member.

3. The vehicle seating assembly of claim 2, wherein the resilient member is an elastic band.

4. The vehicle seating assembly of claim 1, wherein the slip cover is generally tubular in shape.

5. The vehicle seating assembly of claim 1, wherein the slip cover slidably and removably engages with the seatback.

6. The vehicle seating assembly of claim 1, wherein the slip cover has slots therein located on either side of the abrasion resistant material to permit passage of the bolster inserts.

7. The vehicle seating assembly of claim 1, wherein the abrasion resistant material comprises a fabric layer and a resin layer.

8. The vehicle seating assembly of claim 1, wherein the abrasion resistant material is a woven fabric.

9. A vehicle seating assembly comprising:
   a seatback having a seatback frame;
   a bolster insert positioned on a side bolster of the seatback frame;
   a foam layer positioned between the seatback frame and a trim cover, wherein the foam layer and the trim cover are contoured to expose the bolster insert when fully assembled; and
   a slip cover having a front-central portion comprising an abrasion resistant material.

10. The vehicle seating assembly of claim 9, further comprising:
    a rearward portion of the slip cover having a resilient member.

11. The vehicle seating assembly of claim 10, wherein the resilient member is an elastic band.

12. The vehicle seating assembly of claim 9, wherein the slip cover has slots therein located on either side of the abrasion resistant material to permit passage of the bolster inserts.

13. The vehicle seating assembly of claim 9, wherein the abrasion resistant material comprises a fabric layer and a polymer layer.

14. The vehicle seating assembly of claim 9, wherein the abrasion resistant material is a woven fabric.

15. A slip cover for a vehicle seating assembly, comprising:
    a front-central portion having an abrasion resistant material, wherein the abrasion resistant material comprises a fabric layer and a reinforced layer;
    a rearward portion having a resilient member; and
    bolster inserts positioned between the front-central portion and the rearward portion, wherein the bolster inserts are integrally formed with the slip cover.

16. The slip cover for a vehicle seating assembly of claim 15, wherein the resilient member is an elastic band.

17. The slip cover for a vehicle seating assembly of claim 15, wherein the reinforced layer comprises an epoxy.

18. The slip cover for a vehicle seating assembly of claim 15, wherein the slip cover has at least one slot therein positioned between the front-central portion and the rearward portion to permit passage of a component of the vehicle seating assembly.

19. The slip cover for a vehicle seating assembly of claim 18, wherein the components of the vehicle seating assembly in a bolster insert that is operably coupled to a seatback.

* * * * *